Sept. 20, 1955  G. A. PHELAN  2,718,618
VOLTAGE AND FREQUENCY REGULATING SYSTEM
Filed Oct. 24, 1950

INVENTOR.
GEORGE A. PHELAN
BY
ATTORNEY

United States Patent Office 2,718,618
Patented Sept. 20, 1955

2,718,618

VOLTAGE AND FREQUENCY REGULATING SYSTEM

George A. Phelan, East Orange, N. J., assignor to Bendix Aviation Corporation, Teterboro, N. J., a corporation of Delaware Application October 24, 1950, Serial No. 191,879

6 Claims. (Cl. 322—24)

The present invention relates to electrical regulating systems and more particularly to improvements in voltage regulating systems.

According to the invention, the variable resistance element is provided with a main control winding and two trimming coils. The circuit feeding one of the coils is linear, the circuit feeding the other, non-linear. The two coils are differentially connected and so proportioned that at operating voltage the total coil current is not changed, but will tend to correct the proper direction upon an increase or decrease in the output voltage.

It is an object of the invention to provide an improved voltage regulator.

A further object of the invention is to provide an improved voltage regulator having differentially connected trimmer coils.

A further object of the invention is to provide an improved control circuit for a voltage regulator.

The above and other objects and features of the invention will appear more fully hereinafter from a consideration of the following description taken in connection with the accompanying drawing wherein one embodiment of the invention is illustrated by way of example.

Figure 1:
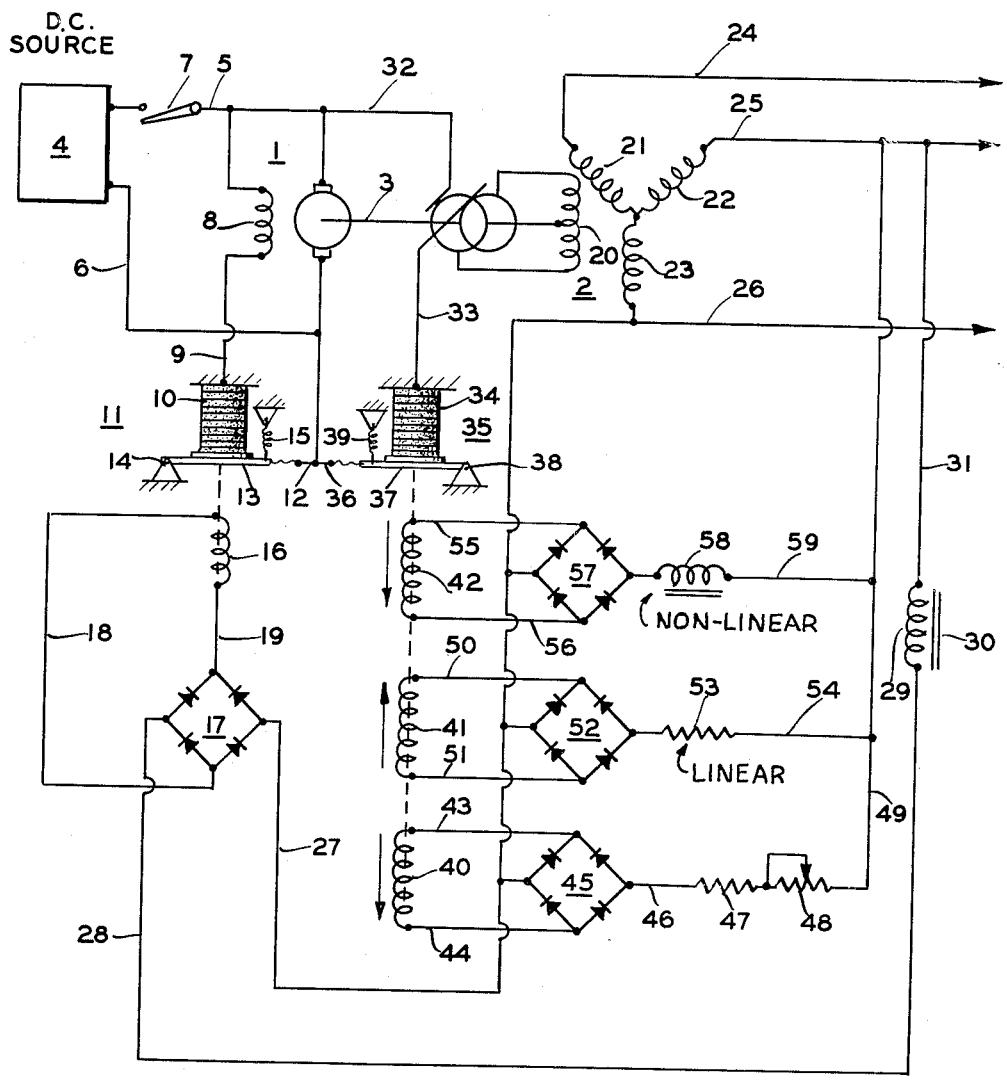

Figure 1 of the drawing is a diagrammatic showing of a voltage and frequency regulating system embodying the invention.

Figure 2:
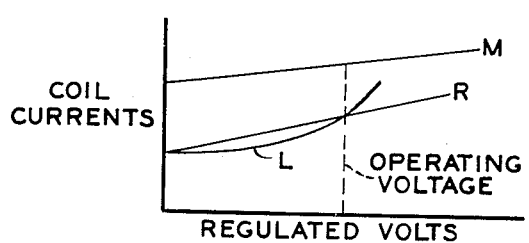

Figure 2 is a diagram for illustrating the operation of the invention.

Referring now to Figure 1 of the drawing, there is indicated by the numeral 1, a motor which drives an A. C. generator or alternator 2 through a shaft 3. The motor is illustrated as a direct current motor deriving electrical energy from a suitable D. C. source and through conductors 5 and 6 and a switch member 7. The motor 1 has a shunt field 8 whose flux determines the speed of the motor 1. One end of the field 8 is connected to the conductor 5, while the opposite end of the field 8 is connected by a conductor 9 to one end of a variable resistance carbon pile element 10 of a regulator indicated generally by the numeral 11. The opposite end of the carbon pile 10 is connected by a conductor 12 to the conductor 6.

The carbon pile element 10 is included in the circuit of the shunt field winding 8 so as to vary the energizing current of the shunt field winding 8 and hence the speed of the motor 1. The speed of the motor 1 increases with a decrease in the excitation of the winding 8 and the speed decreases with an increase in the excitation thereof.

The regulator 11 may be of a type described and claimed in U. S. Patent No. 2,427,805, granted to William G. Neild. The regulator 11 is illustrated diagrammatically herein as including an armature 13 pivoted at 14 and biased by a spring 15 in a direction for decreasing the resistance of the carbon pile element 10. Opposing the spring 15 is an electromagnetic control winding 16. The winding 16 is connected across the output terminals of a rectifier 17 by conductors 18 and 19.

The A. C. generator 2 driven by the motor 1 through the shaft 3 is illustrated as having a rotating exciting field 20 and a three-phase stator comprising windings 21, 22 and 23. Output conductors 24, 25 and 26 lead from the stator windings 21, 22 and 23 to a suitable load (not shown). It is understood, however, that the A. C. generator 2 could be of a type having a stationary field and rotor armature winding, the rotating field type being shown by way of example and not as a limitation. Further, the generator may be single phase or multi-phase.

One input terminal of the rectifier 17 is connected by conductor 27 to output line 26. The other input terminal of the rectifier 17 is connected by conductor 28 to one end of a reactance winding 29 having an iron core 30. The opposite end of the winding 29 is connected by a conductor 31 to the output line 25. The impedance of the reactance winding 29 is equivalent to the resistance it replaces at the frequency which it is desired to maintain. Thus, current in the winding 16 decreases with an increase in frequency at a constant voltage across the lines 25 and 26. The latter action in turn causes adjustment of the carbon pile resistance 10 so as to vary the excitation of the motor winding 8 so as to maintain the desired constant motor speed. It is understood, however, that other frequency regulating means may be used.

The exciting winding 20 of the A. C. generator 2 has one end connected through conventional slip rings and conductor 32 to the conductor 5, while the opposite end is connected through conventional slip rings and conductor 33 to one end of a variable resistance carbon pile element 34 of a regulator indicated generally by the numeral 35. The opposite end of the carbon pile element 34 is connected by a conductor 36 to the conductor 6.

The carbon pile 34 is included in the circuit of the exciting winding 20 of the generator 2 so as to vary the exciting current and hence the output voltage from the generator 2. The output voltage from the generator 2 increases with increase in the excitation of the exciting winding 20 and decreases upon a decrease in the excitation thereof.

The regulator 35 may be of the type described in U. S. Patent No. 2,427,805 granted to William G. Neild. The regulator 35 is shown diagrammatically herein as including an armature 37 pivoted at 38 and biased by a spring 39 in a direction for decreasing the resistance of the carbon pile 35. Opposing the spring 39 is a main electromagnetic control winding 40 and the trimmer windings 41 and 42.

The winding 40 is connected by conductors 43 and 44 across the output terminals of a rectifier 45. One input terminal of a rectifier 45 is connected by the conductor 27 to the output line 26. The other output terminal of the rectifier is connected by a conductor 46, resistors 47 and 48, and a conductor 49 to the output line 25.

The winding 41 is connected by conductors 50 and 51 across the output terminals of a rectifier 52. One output terminal of the rectifier is connected to the conductor 27 and the other output terminal is connected to one end of a resistor 53. The other end of the resistor 53 is connected by a conductor 54 to the conductor 49.

The winding 42 is connected by conductors 55 and 56 across the output of a rectifier 57. One input terminal of the rectifier 57 is connected to the conductor 27 and the other input terminal is connected to one end of a saturable choke 58. The other end of the choke is connected by a conductor 59 to the conductor 49.

In operation, the circuits feeding the coils 41 and 42 of the regulator 35 are differentially connected so that at operating voltage the total coil current is not changed. However, upon the voltage varying from the operating voltage, the characteristics of the coils 41 and 42 are such that they tend to correct in the proper direction to aid the main coil 40. The coil 41 is connected in opposition to the coil 40 and the coil 42 is connected in aiding relationship to the coil 40.

The resistance 47 is a temperature compensating resistor and corrects for ambient temperature changes. The resistor 48 permits adjustment for setting the desired voltage.

Figure 2 is a diagram which illustrates the principle of the invention. The curve R shows the coil current of the trimming coil 41 and the curve L, the coil current of the coil 42 as affected by the output voltage. Inasmuch as the coils 41 and 42 are differentially connected, the currents therein are in opposition. The resistor 53 and inductance 58 are so proportioned that the curves R and L intersect at the desired operating voltage. The curve M shows the coil current in the main coil 40.

Thus, there is provided a regulator that has a linear and a non-linear trimming coil that is substantially independent of ambient temperature changes without complicated circuits.

Although only one embodiment of the invention has been illustrated and described, various changes in the form and relative arrangement of the parts, which will now appear to those skilled in the art, may be made without departing from the scope of the invention.

What is claimed is:

1. A voltage regulator for use with an alternating current generator having an exciting field winding, said regulator comprising a variable resistance element for controlling the energization of said field winding, electromagnetic means for operating said variable resistance element, said electromagnetic means comprising a main control winding connected across the output of said generator and so proportioned to hold said variable resistance element in a fixed position for a predetermined output, a first auxiliary winding including a linear circuit connected across the output of said generator in opposing relationship to said main winding, a second auxiliary winding including a non-linear circuit connected across the output of said generator in aiding relation to said main windings, said auxiliary windings being so proportioned that at operating voltage the total winding current is not changed.

2. A voltage regulator for use with an alternating current generator, comprising a variable resistance element for controlling the energization of said generator, electromagnetic means for operating said variable resistance element in response to a condition to be regulated; said electromagnetic means comprising a main coil, a circuit including temperature compensating means for connecting said main coil across the output of said generator, a first trimmer coil, a circuit including a resistor for connecting said first trimmer coil across the output of said generator in opposition to said main coil, a second trimmer coil, and a circuit including a saturable inductance for connecting said second trimmer coil across the output of said generator in aiding relationship to said main coil, said trimmer coils being opposing and equal at the regulating voltage and affecting said main coil in the proper direction upon a departure therefrom.

3. In an electrical system the combination comprising an alternating current generator, frequency controlling means responsive to the output frequency of said generator for maintaining said output frequency substantially constant, a control winding for controlling the output voltage of said generator, a variable resistance element for regulating the energization of said control winding, a main electromagnetic winding responsive to output voltage for effecting said variable resistance element in a direction to maintain said output voltage substantially constant, and a pair of auxiliary windings responsive to said output voltage for coacting with said main winding to maintain said output voltage substantially constant, one of said windings being connected in opposition to said main winding by means having a linear characteristic, the other of said windings being connected to aid said main winding by means having a non-linear characteristic.

4. In a regulating system for a generator in combination, an alternating current generator adapted for operation at a substantially constant frequency, an exciting winding for controlling the voltage output of said generator, a variable resistance element connected in said exciting field circuit; electromagnetic means for controlling said resistance element, said electromagnetic means including a main winding, a first rectifier, a first circuit for connecting said main winding through said first rectifier to the output of said generator, a second winding, a second rectifier, a linear circuit for connecting said second winding through said second rectifier to the output of said generator in opposing relation to said main winding, a third winding, a third rectifier, a non-linear circuit for connecting said third winding through said third rectifier to the output of said generator in aiding relationship to said main windings, said second and third windings being proportioned so that the total winding current is not changed for a predetermined output voltage and tends to correct in the proper direction upon a departure from said predetermined voltage.

5. The combination as set forth in claim 4 wherein said linear circuit includes a resistor as the linear element, and said non-linear circuit includes a saturable inductance as the non-linear element.

6. A voltage regulator for use with an alternating-current supply of substantially constant frequency, comprising a variable resistance element for controlling said alternating supply, a main electromagnetic winding for regulating said resistance element in accordance with said output voltage to maintain said output voltage substantially constant, a linear trimming circuit including an electromagnetic winding for supplying a corrective current when said output voltage is below the predetermined output voltage, and a non-linear trimming circuit including an electromagnetic winding for supplying a corrective current when said output voltage is above said predetermined voltage.

References Cited in the file of this patent

UNITED STATES PATENTS

| | | |
|---|---|---|
| 1,789,146 | Livingston | Jan. 13, 1931 |
| 2,428,566 | Harder et al. | Oct. 7, 1947 |
| 2,459,607 | Witzke | Jan. 18, 1949 |
| 2,464,439 | Davis | Mar. 15, 1949 |
| 2,499,272 | Haas | Feb. 28, 1950 |